(12) United States Patent
Lainema (10) Patent No.: US 8,005,145 B2
(45) Date of Patent: Aug. 23, 2011

(54) METHOD AND APPARATUS FOR TRANSFERRING VIDEO FRAME IN TELECOMMUNICATION SYSTEM

(75) Inventor: Jani Lainema, Irving, TX (US)

(73) Assignee: Nokia Corporation, Espoo (FI)

( * ) Notice: Subject to any disclaimer, the term of this patent is extended or adjusted under 35 U.S.C. 154(b) by 598 days.

(21) Appl. No.: 10/885,256

(22) Filed: Jul. 6, 2004

(65) Prior Publication Data

US 2004/0264574 A1    Dec. 30, 2004

Related U.S. Application Data

(63) Continuation of application No. 09/637,773, filed on Aug. 11, 2000, now Pat. No. 6,782,053.

(51) Int. Cl.
    *H04N 7/12* (2006.01)
(52) U.S. Cl. .................................. 375/240.16
(58) Field of Classification Search .................. None
    See application file for complete search history.

(56) References Cited

U.S. PATENT DOCUMENTS

| | | | |
|---|---|---|---|
| 5,210,605 A | 5/1993 | Zaccarin et al. | 358/105 |
| 5,812,199 A * | 9/1998 | Lu et al. | 375/240.16 |
| 6,081,296 A * | 6/2000 | Fukunaga et al. | 375/240.12 |
| 6,163,575 A * | 12/2000 | Nieweglowski et al. | 375/240.16 |
| 6,205,174 B1 * | 3/2001 | Fert et al. | 375/240.03 |
| 6,275,532 B1 * | 8/2001 | Hibi et al. | 375/240.17 |
| 6,295,089 B1 * | 9/2001 | Hoang | 348/390.1 |
| 2004/0223548 A1 * | 11/2004 | Kato et al. | 375/240.16 |

FOREIGN PATENT DOCUMENTS

| | | |
|---|---|---|
| EP | 0 535 746 | 9/1992 |
| EP | A2-0773 688 | 5/1997 |
| EP | 0 863 675 | 2/1998 |
| GB | 2 317 525 | 9/1996 |
| JP | 2004534411 T | 11/2004 |
| WO | 99/07159 A2 | 2/1999 |
| WO | 0215585 A1 | 2/2002 |

OTHER PUBLICATIONS

Japanese Official Office Action dated Dec. 16, 2010.

* cited by examiner

*Primary Examiner* — David Czekaj
(74) *Attorney, Agent, or Firm* — Perman & Green, LLP (57) ABSTRACT

A method of coding video frames in a telecommunication system, comprising: forming a video frame of consecutive stationary frames, storing the frame reconstruction data of at least one frame as a reference frame and the motion data of earlier coded neighboring blocks, defining by means of the motion data of one or more earlier coded neighboring blocks the motion data of the block to be coded, which neighboring block is formed by means of the stored reference frame, defining the frame reconstruction data of the frame to be coded, selecting for use the frame reconstruction data and motion data representing the block to be coded, which provide a pre-defined coding efficiency with a predefined picture quality.

55 Claims, 5 Drawing Sheets

METHOD AND APPARATUS FOR TRANSFERRING VIDEO FRAME IN TELECOMMUNICATION SYSTEM

The present application is a continuation of application Ser. No. 09/637,773, filed on 11 Aug. 2000, which issued as U.S. Pat. No. 6,782,053 on 24 Aug. 2004.

FIELD OF THE INVENTION

The invention relates to a method and an apparatus for coding and decoding a video frame in a telecommunication system, when the video frame is made up of a string of consecutive stationary frames, in which the frames to be transmitted are typically divided into frame blocks or segments, for instance pixel groups, specific for each frame and the data in each frame block typically comprises information indicating the luminance, color and location of the frame block.

BACKGROUND OF THE INVENTION

Transferring video frames in telecommunication systems, such as video phones, video conference systems or Internet connections, is a demanding task due to the large amount of data needed to transfer a video frame, since the more bits are needed to transfer the data, the higher the data transmission rate must be. Various methods have been developed to solve this problem. To transfer a frame, the frame is usually divided into frame blocks whose size is selected to suit the system. Frame block information generally comprises information on the luminance, color and location of the frame block in the frame itself. The frame block data is compressed by each block using a desired coding method. The compression is based on removing the less significant data. Compression methods are divided primarily into three classes: spectral redundancy reduction, spatial redundancy reduction and temporal redundancy reduction. Various combinations of these methods are typically used in compression.

A YUV color model, for instance, is applied to spectral redundancy reduction. The YUV color model utilizes the fact that the human eye is more sensitive to changes in luminance than in chrominance, i.e. color. The YUV model has one luminance component (Y) and two chrominance components (U, V). The chrominance components are also sub-sampled. For instance, a luminance block according to the H.263 video coding standard is 16×16 pixels and both chrominance blocks, which cover the same area as the luminance block, are 8×8 pixels. The combination of one luminance block and two chrominance blocks is in this standard called a macro block.

To reduce spatial redundancy, a discrete cosine transformation (DCT), for instance, is used, in which the block to be compressed is preferably 8×8 pixels. In a DCT, the pixel presentation of a frame block is transformed into a space-frequency presentation. In addition, only the signal frequencies which exist in a frame block have high-amplitude coefficients, whereas the coefficients of the signals that do not exist in a frame block are close to zero. DCT is also a lossless transformation and interference is caused to the signal in quantizing only.

Temporal redundancy can be reduced by utilizing the fact that consecutive frames usually resemble each other, so instead of compressing each individual frame, motion data of the frame blocks is generated. The basic principle is as follows: an as good as possible reference block which has been coded earlier is searched for the frame block to be coded, the motion between the reference block and the frame block to be coded is modeled and the calculated motion vector coefficients are transmitted to the receiver. The difference between the block to be coded and the reference block is indicated as a prediction error component or frame. The problem is to find a reference block which produces as good a coding efficiency as possible (a sufficiently good picture quality with as small an amount of bits as possible) and a high calculation capacity, and thus also calculation time, required by the comparison.

BRIEF DESCRIPTION OF THE INVENTION

It is thus an object of the invention to provide an improved method for coding video frames, an improved video coder and an improved subscriber terminal. The invention is based on using the frame reconstruction data of at least one or more reference frames or reference blocks and of one or more earlier coded neighbouring blocks in coding the frame reconstruction data. The frame reconstruction data and motion data coded with the method of the invention or with another known method is selected for use depending on how the desired coding efficiency is obtained with a sufficient picture quality.

This is achieved by a method of coding video frames in a telecommunication system, comprising: forming a video frame of consecutive stationary frames, storing the frame reconstruction data of at least one frame as a reference frame and the motion data of earlier coded neighbouring blocks, defining by means of the motion data of one or more earlier coded neighbouring blocks the motion data of the block to be coded, which neighbouring block is formed by means of the stored reference frame, defining the frame reconstruction data of the frame to be coded, selecting for use the frame reconstruction data and motion data representing the block to be coded, which provide a pre-defined coding efficiency with a predefined picture quality.

This is achieved by a method of coding video frames in a telecommunication system, comprising: forming a video frame of consecutive stationary frames, storing the frame reconstruction data of at least one frame as a reference frame and the motion data of earlier coded neighbouring blocks, defining the motion data of a frame block to be coded using only the neighbouring blocks which have the same reference frame used to code the frame reconstruction data of the block to be coded, selecting for use the frame reconstruction data and motion data, which provide a pre-defined coding efficiency with a pre-defined picture quality.

The invention also relates to a subscriber terminal comprising: means for forming a video frame of consecutive stationary frames, means for storing the frame reconstruction data of at least one frame as a reference frame and the motion data of earlier coded neighbouring blocks, means for defining by means of the motion data of one or more earlier coded neighbouring blocks the motion data of the block to be coded, which neighbouring block is formed by means of the stored reference frame, means for defining the frame reconstruction data of the frame to be coded, means for selecting for use the frame reconstruction data and motion data representing the block to be coded, which provide a pre-defined coding efficiency with a predefined picture quality.

The invention also relates to a subscriber terminal comprising: means for forming a video frame of consecutive stationary frames, means for storing the frame reconstruction data of at least one frame as a reference frame and the motion data of earlier coded neighbouring blocks, means for defining the motion data of a frame block to be coded using only the neighbouring blocks which have the same reference frame used to code the frame reconstruction data of the block to be coded, means for selecting for use the frame reconstruction data and motion data, which provide a pre-defined coding efficiency with a pre-defined picture quality.

The invention also relates to a video coder comprising: means for forming a video frame of consecutive stationary frames, means for storing the frame reconstruction data of at least one frame as a reference frame and the motion data of earlier coded neighbouring blocks, means for defining by means of the motion data of one or more earlier coded neighbouring blocks the motion data of the block to be coded, which neighbouring block is formed by means of the stored reference frame, means for defining the frame reconstruction data of the frame to be coded, means for selecting for use the frame reconstruction data and motion data representing the block to be coded, which provide a pre-defined coding efficiency with a predefined picture quality.

The invention also relates to a video coder comprising: means for forming a video frame of consecutive stationary frames, means for storing the frame reconstruction data of at least one frame as a reference frame and the motion data of earlier coded neighbouring blocks, means for defining the motion data of a frame block to be coded using only the neighbouring blocks which have the same reference frame used to code the frame reconstruction data of the block to be coded, means for selecting for use the frame reconstruction data and motion data, which provide a pre-defined coding efficiency with a pre-defined picture quality.

The invention also relates to a computer program which can be read by a computer and which executes the method of coding video frames in a telecommunication system, comprising: forming a video frame of consecutive stationary frames, storing the frame reconstruction data of at least one frame as a reference frame and the motion data of earlier coded neighbouring blocks, defining by means of the motion data of one or more earlier coded neighbouring blocks the motion data of the block to be coded, which neighbouring block is formed by means of the stored reference frame, defining the frame reconstruction data of the frame to be coded, selecting for use the frame reconstruction data and motion data representing the block to be coded, which provide a pre-defined coding efficiency with a predefined picture quality.

The invention also relates to a computer program which can be read by a computer and which executes the method of coding video frames in a telecommunication system, comprising: forming a video frame of consecutive stationary frames, storing the frame reconstruction data of at least one frame as a reference frame and the motion data of earlier coded neighbouring blocks, defining the motion data of a frame block to be coded using only the neighbouring blocks which have the same reference frame used to code the frame reconstruction data of the block to be coded, selecting for use the frame reconstruction data and motion data, which provide a pre-defined coding efficiency with a pre-defined picture quality.

The method and apparatus of the invention provide savings in calculation time and capacity while the picture quality remains adequate.

BRIEF DESCRIPTION OF THE FIGURES

In the following, the invention will be described by means of preferred embodiments, with reference to the attached drawings in which.

DETAILED DESCRIPTION OF THE INVENTION

Figure 1:
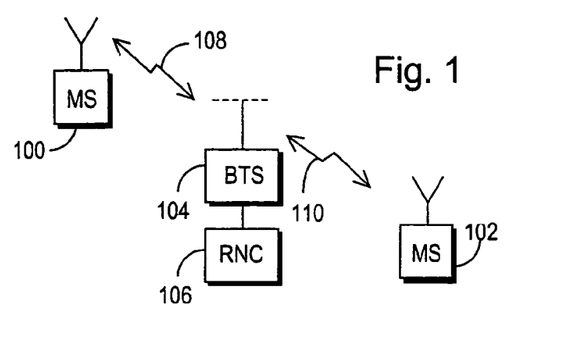
FIG. 1 illustrates an example of a telecommunication system.

FIG. 1 illustrates in a simplified manner one digital data transmission system to which the solution of the invention can be applied. It is a part of a cellular radio system comprising a base station 104 which is in radio contact 108 and 110 with subscriber terminals 100 and 102 which can be terminals installed fixedly or in a vehicle or portable terminals. Transceivers in the base station are connected to an antenna unit, with which the radio link to the subscriber terminals is implemented. The base station is further in contact with a base station controller 106 which transmits the connections of the terminals elsewhere in the network. The base station controller controls in a centralized manner several base stations connected to it. A control unit in the base station controller takes care of call control, data traffic control, mobility management, collection of statistics, and signaling.

The cellular radio system can also have a connection to the public telephone network, in which case a transcoder belonging to the system transforms the different digital coding formats of speech used between the public telephone network and the cellular radio network to suit each other, for instance from the 64 kbit/s format of the fixed network to a cellular radio network format (e.g. 13 kbit/s) and vice versa.

It is obvious to a person skilled in the art that the invention can also be applied to fixed telecommunication systems, such as the Internet.

Figure 2A:
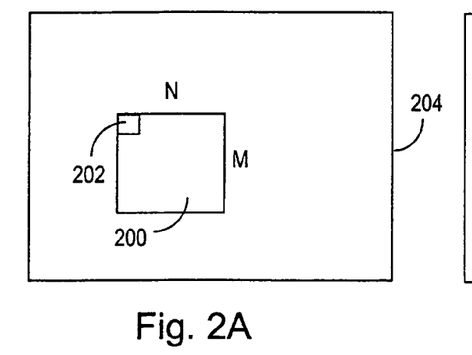
FIGS. 2a to 2c illustrate one estimation process of vectors using a reference frame.
Figure 2B:
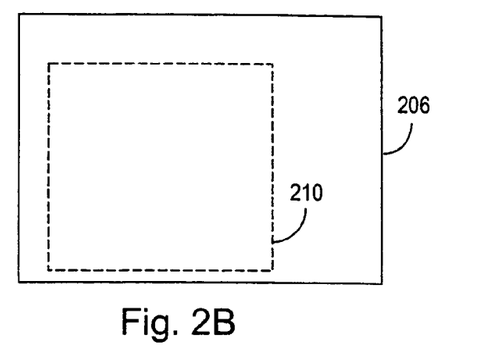
Figure 2C:
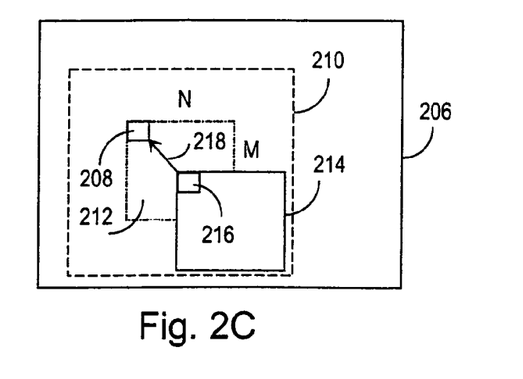

The aim in coding a video frame is to reduce the number of bits required to transfer the frame. FIGS. 2a to 2c show in a simplified manner a prior art coding method of motion which is based on predicting the motion vector of a frame block (the term block is also used in the text) using a reference frame stored earlier in memory. This type of coding is called intercoding which means utilizing the similarities between the frames in a string of frames in compression coding.

In the example of FIGS. 2a to 2c, the reference frame 206 has been divided into blocks or segments and coded earlier. FIGS. 2b to 2c do not show frame blocks. The reference frame can be before or after the frame to be coded in the string of frames. FIG. 2a shows the current frame being coded 204 which is also divided into blocks, of which only one block 200 is shown for clarity's sake. The size of the blocks is N×M. The blocks are typically squares, i.e. N=M, but can also be rectangular, for instance, in their geometry. The current block 200 and the reference block 214 shown in FIG. 2c need not be geometrically similar, because in reality, too, the filmed objects change, such as rotate or twist. The size and shape of the block is defined suitable for each situation taking into consideration the following matters, for instance: a small block size provides a better picture, but reduces the reliability of the defined motion vector, because the definition is made by means of a few pixels only. More motion vector data must also be generated, if smaller blocks are used, because then the frame must be divided into a greater number of blocks. In addition, fast algorithms in defining motion vectors are more efficient when the block size is large. For instance, in some of the current video coding standards N=M=16.

To estimate the motion, as matching a reference block as possible is found in the reference frame 206 for the block 200 being coded, this being 214 in FIG. 2c. The suitability of the reference blocks depends on the selection criterion. The purpose of the selection criterion is typically to find a block, by means of which it is possible to minimize the number of bits required for transferring the block being coded in such a manner that the picture quality remains sufficiently good. Thus, the selection criteria can vary depending on the object of application.

The search is usually performed in the reference frame 206 in an area which is in a frame location corresponding to the block 200 being coded in the current frame 204 and in a certain area in the immediate proximity, depicted by the search area 210 in FIGS. 2b and 2c. By limiting the search area smaller than the entire reference frame, the time used in searching and the required calculation is reduced. The size of the search area is defined suitable for the object of application, for instance by determining on the basis of the frames of the frame string coded earlier, whether the motion is slow or fast; if the motion is slow, the search area can be limited smaller than if the motion is fast. The search is typically conducted in the surroundings of the predicted motion vector.

The location of the frame block is in the example of FIGS. 2a to 2c indicated with coordinates (x, y) in the upper left corner of the block. The x coordinate indicates the location of the pixel or block in horizontal direction and the y coordinate the location of the pixel or block in vertical direction. The coordinates of the block being coded are marked as 202. In FIG. 2c, the best possible reference frame block 214 has been found in the search area 210. The coordinates (x, y) 208 are those of the location where the block 200 being coded would be if it had not moved and thus the same as the coordinates 202. They are shown for the purpose of illustration. The block 212 depicts the block 200 had it not moved and is also shown for the purpose of illustration. The motion of the frame block being coded can now be indicated as a change from the coordinates (x+u, y+v) 216 to the coordinates (x, y) 208. In general, the coordinates (x, y) are defined as origin, so the motion vector 218 of the block being coded can be indicated as coordinates (u, v). The motion vector can also be indicated using definition of motion vector coefficients and motion models.

Figure 3:
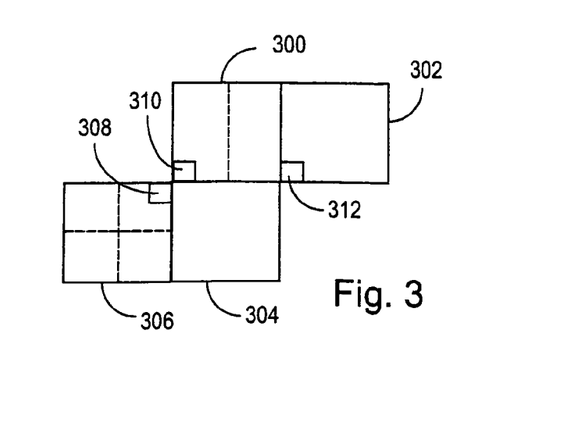
FIG. 3 illustrates one estimation process of a motion vector using neighbouring blocks.

FIG. 3 shows in a simplified manner prior art motion coding methods which are based on predicting the motion vector coefficients of a frame block being coded using earlier coded neighbouring blocks of the frame being coded. The neighbouring blocks of the frame block 304 being coded, which have already been coded earlier and which are used to predict the motion vector coefficients of the frame block being coded are here referred to as prediction candidates. In FIG. 3, the prediction candidates are neighbouring blocks 300, 302, 306. The prediction candidates 300, 302, 306 are in the example of FIG. 3 marked for identification with certain pixel locations 308, 310, 312. The prediction candidate 306 is on the left side of the block being coded and marked with the pixel location 308, the prediction candidate 300 is above the block being coded and marked with the pixel location 310 and the prediction candidate 302 is in the top right corner of the block being coded and marked with the pixel location 312. As seen from FIG. 3, the pixel locations 308, 310, 312 reside in their blocks in close proximity to the block 304 being coded. It should be noted that the number and location of the neighbouring blocks with respect to the block being coded may differ from those shown in FIG. 3.

In the case shown in FIG. 3, all three prediction candidates are used in predicting the motion vector coefficients of the block 304 being coded. The required motion vector coefficients can, for instance, be predicted as a median of the motion vector coefficients obtained from these prediction candidates. It is also possible to use only one prediction candidate in predicting the motion vector coefficients of the block 304, in which case the coefficients are obtained from the motion vector coefficients of the prediction block 306, the motion vector coefficients of the prediction block 300 or the motion vector coefficients of the prediction block 302.

Earlier coded neighbouring blocks that are farther than in the immediate proximity can also be used, but in such a case it should be done taking into consideration that the difference in the motion of the blocks usually increases while the distance grows.

Inter- and intra-coding are typically combined block by block in coding video frames to obtain the best possible result. An intra-coded frame can be sent at suitable intervals to prevent the accumulation of possible errors caused by the transmission channel from one frame to another, finally causing the failure of the decoding of the frame.

The methods shown in FIGS. 2a to 2c and 3 can be used both in coding and decoding. The method used by the coder with the necessary frame data is transmitted to the decoder as a bit stream.

It should be noted that as shown in FIG. 3, the blocks can also be segmented. Segmentation is preferable in situations where different parts of the frame move in different ways, for instance the background remains the same while a single object, such as a person, a car or the like, moves. A frame block can be segmented by dividing it in segments vertically, as in block 300, horizontally, of which there is no example, or in both directions, as in block 306. By segmentation, it is also possible to reduce the number of bits being transferred by using a suitable part of another already coded frame.

When defining the motion vector coefficients of the frame block being coded, various known models for motion estimation are utilized. Different models are suitable for defining different motion, such as presenting vertical and horizontal motion or presenting rotation. Such models include the affine motion model in which the motion of a pixel, frame segment or block is indicated by a formula in which $\Delta x$ and $\Delta y$ form the motion vector $$\Delta x(x, y) = a_0 + a_1 x + a_2 y$$

$$\Delta y(x, y) = b_0 + b_1 x + b_2 y \qquad (1)$$

wherein $a_0$, $a_1$, $a_2$, $b_0$, $b_1$ and $b_2$ are motion vector coefficients and x and y are vector components, of which x indicates the location of a pixel or a block in horizontal direction and y the location of a pixel or a block in vertical direction, or the translational model in which the motion of a pixel, frame segment or block is indicated by a formula in which $\Delta x$ and $\Delta y$ form the motion vector $$\Delta x(x, y) = a_0$$

$$\Delta y(x, y) = b_0 \qquad (2)$$

wherein $a_0$ and $b_0$ are motion vector coefficients and x and y are vector components. The used motion models are stored in the memory of both the coder and the decoder. If several motion models are used in coding, the coder selects the model according to the motion (e.g. with upward motion, a model indicating upward motion is used in coding) and information on the used model is transmitted to the decoder together with the motion vector coefficients.

Figure 4:
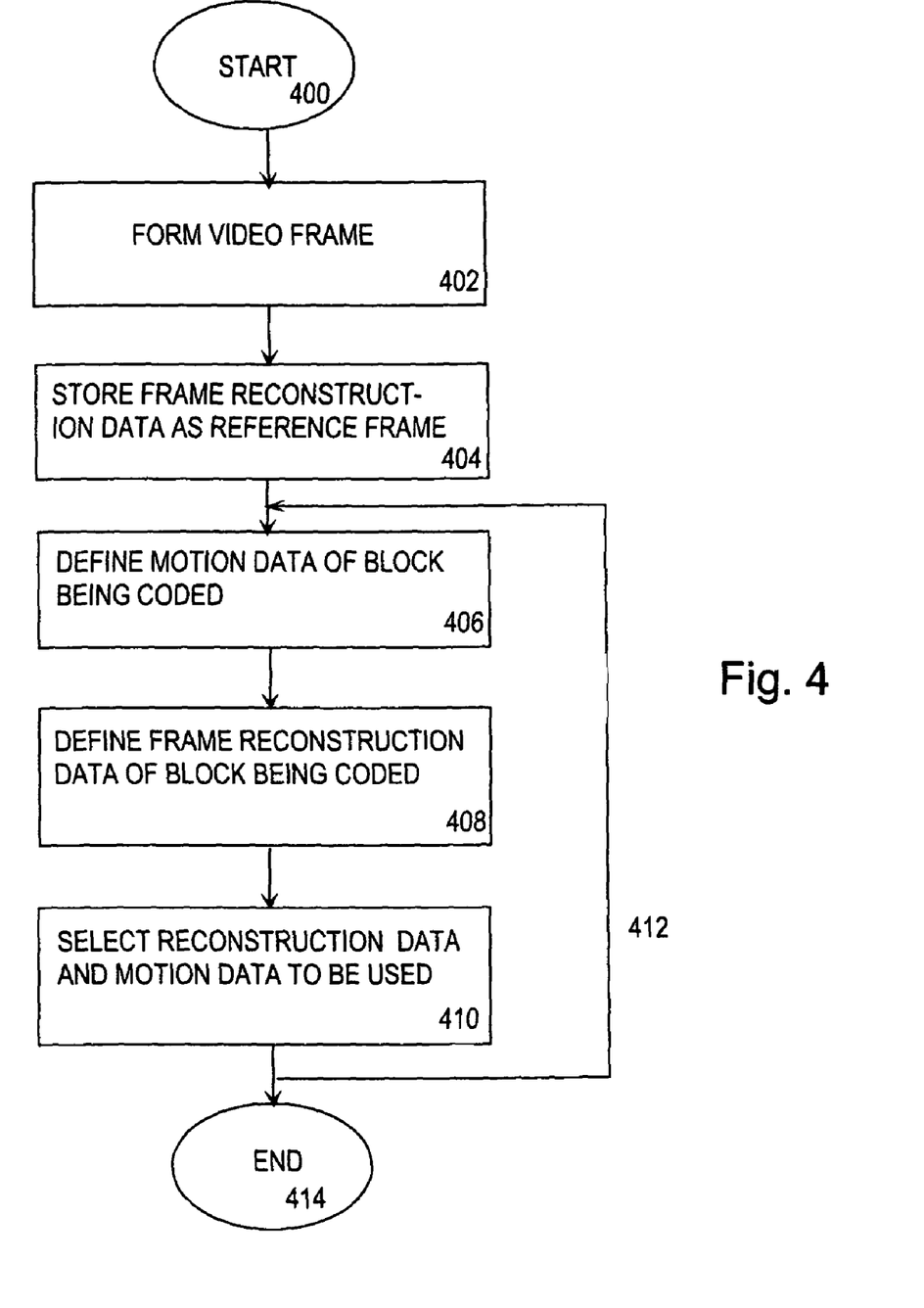
FIG. 4 is a flow chart which shows method steps of finding a reference block and predicting a motion vector.

FIG. 4 is a flow chart showing method steps for video frame coding. In the following description, a frame block refers, for instance, to a block, segment or macro block according to the YUV model formed by pixels. The execution of the method starts in block 400.

In block 402, a video frame is formed of consecutive stationary frames. To form the video frame, the stationary frames are sent preferably at a speed at which the human visual system no longer distinguishes separate frames from each other.

In block 404, the coded reconstruction data of frame blocks (e.g. color and luminance of pixels and the prediction error frame obtained from the calculation of motion vector coefficients) are stored into memory. The frame reconstruction data is coded according to the applied standard, for instance H.263 or MPEG. The definition of the motion vector coefficients and the prediction error frame is described above. One or more reference frames are formed of the frame reconstruction data stored in memory. In addition, the motion data of the earlier coded neighbouring blocks, i.e. the motion vector coefficients and a possibly used motion. model, are stored into memory. It is most preferable to use neighbouring blocks in close proximity to the block being coded, but sometimes it is also possible to use earlier coded blocks farther away in the frame.

In block 406, the motion data of the block being coded is defined by means of earlier coded neighbouring blocks, preferably using the motion vector coefficients of one or more neighbouring blocks.

In block 408, the reconstruction data of the block being coded is defined using a reference frame, for instance.

The method can be intensified by calculating the motion data of the frame block being coded using only the neighbouring blocks which have the same reference frame that was used to code the frame reconstruction data of the block being coded. Similarities often exist between frames in the same frame string, so it is probable that either a block corresponding to the block being coded is found or a block that is similar enough is found in an earlier coded frame from which a suitable reference block has already been found for an earlier coded neighbouring block. For instance, motion vector coefficients of one or more neighbouring blocks are used and the search area of the reference block of the block being coded is restricted in the reference frame to the environment defined by the motion vector coefficients of the neighbouring block.

In a situation in which only one inter-coded neighbouring block has the same reference frame as the block being coded, the motion vector of this neighbouring block is selected as one motion vector candidate, another candidate can, for instance, be a median calculated from several neighbouring block motion vectors.

It should be noted that the block, which is used in coding the block, is coded in the same manner (inter) with which the block being coded will be coded, i.e., if the neighbouring block is intra-coded, it has no reference frame. If there is no prediction candidate having a reference frame, prior art intra-coding can be used or all reference frames stored in memory can be checked.

A reference block is the frame block that the video coder, i.e. coder with which the frame reconstruction data of the frame block is coded, uses in compression coding. A frame block, which is as matching as possible with the block being coded and which was searched from one or more reference frames that were coded earlier and stored in memory, is selected as the reference block, whereby the prediction error frame remains as small as possible.

In block 410, the coding method is selected, with which the frame reconstruction data and motion data of the frame block being coded can be coded most advantageously, i.e. a pre-defined coding efficiency is reached. with a pre-defined picture quality. It should be noted that as the coding method of the block being coded either the above-mentioned coding by means of the motion data of the neighbouring blocks is selected, or any prior art method, such as inter-coding, in which the block being coded is coded directly by means of the reference block found from the reference frame. In selecting the coding method, the aim may, for instance, be to make the number of bits as small as possible while the quality of the picture corresponds to that of a normal video picture or to make the number of bits match that of the used standard, even though a smaller number of bits was enough to achieve a picture quality according to the application object.

Coding efficiency can be estimated by means of a Lagrangian function, for instance, which defines the most effective segmentation and coding and which is $$L(S_k)=D(S_k)+\lambda R(S_k) \qquad (3)$$

wherein $D(S_k)$ is an error created in despreading the frame, $R(S_k)$ is the number of bits required to transfer the frame, and $\lambda$ is the Lagrangian constant.

The Lagrangian function depicts the connection between the quality of the frame being transferred and the bandwidth required on the transmission path; in general, the higher quality picture, the bigger the bandwidth. The selection of the most advantageous compression coding is always a compromise between the required number of bits and the picture quality.

Arrow 412 depicts the repeatability of the method block by block until the frame is coded. It should be noted that the method is preferably repeated until all frames in the string of frames are coded.

The execution of the method ends in block 414.

Figure 5:
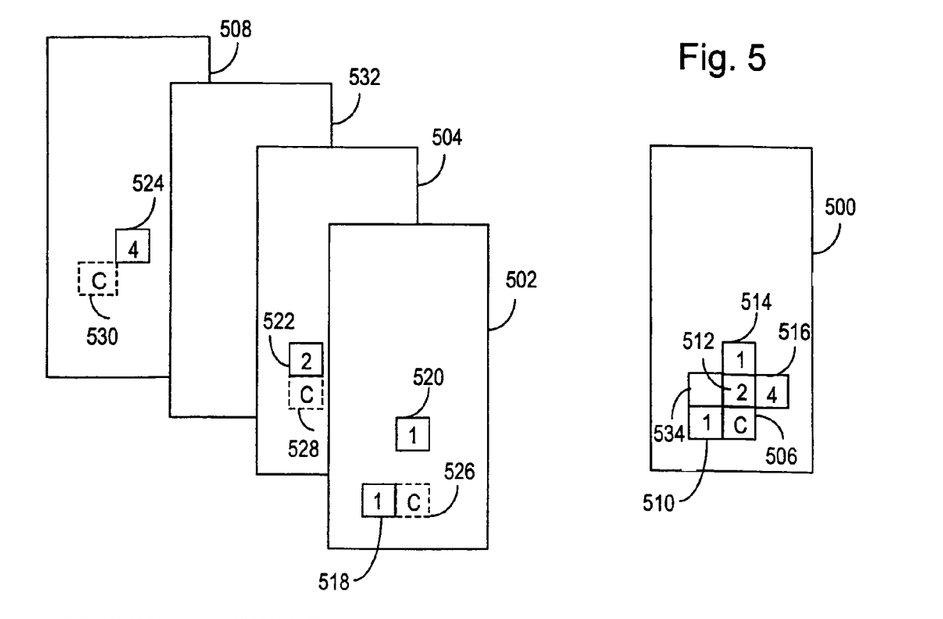
FIG. 5 illustrates an example of finding a reference block and predicting a motion vector.

FIG. 5 illustrates an example of predicting motion vectors and finding a reference block, when only the neighbouring blocks are used, which have the same reference frame that was used in coding the frame reconstruction data of the block being coded. It should be noted that that in coding the block, prior art methods are usually also used. In the end, the coding method is selected for use, which provides the desired coding efficiency with a sufficient picture quality.

The frame page 500 being coded is divided into blocks, of which only a few are shown for clarity's sake. Block 506 is the one being coded. Frames 502, 504, 532 and 508 are reference frames stored in memory. The reference frame of blocks 510 and 514 of the earlier coded neighbouring blocks, marked as number 1, is the frame 502. The block 506 being coded and the reference blocks 510 and 514 have not moved in the frame 500 in comparison with the frame 502. The reference frame of the neighbouring block 512, marked as number 2 in the figure, is the frame 504 and the reference frame of the neighbouring block 516, marked as number 4 in the figure, is the frame 508. The blocks in the frame 500 have moved in comparison with the frames 504 and 508. The frame 532 has not been used in coding any of the neighbouring blocks of the block 506 being coded, i.e. it is not a reference frame of any neighbouring block, so the frame 532 is not used in this example to find a reference block for the block 506 being coded.

Next, the neighbouring blocks 510 and 514 are used as prediction candidates of the motion vectors of the block 506 being coded. A check is made to see whether the coding type (inter) of the prediction candidates is the same as the one to be used in coding the current block. If this is so, the block 526 is used as a reference block and the motion vector coefficients are obtained by calculating an average or median of the motion vector coefficients which have been obtained by comparing the location of the blocks 510 and 518, from which the motion vector coefficients have been obtained for the neighbouring block 510, and the location of the blocks 514 and 520, from which the motion vector coefficients have been obtained for the neighbouring block 514. In addition, a prediction error frame is defined by comparing the block 506 being coded with the reference block 526. In the example of FIG. 5, the block location in frames 500 and 502 has not changed, so the motion vector coefficients are not defined.

Next, the coding type of the neighbouring block 512 is checked. If it is the same as the one to be used in the current block 506, a reference block is searched for in frame 504 and the motion vector coefficients obtained from the comparison of the blocks 512 and 522 are used as the motion vector coefficients of the block 506. The prediction error frame is then defined by means of the reference block 528.

Next, the coding type of the neighbouring block 516 is checked. If it is the same as the one to be used in the current block 506, a reference block is searched for in frame 508 and the motion vector coefficients obtained from the comparison of the blocks 516 and 524 are used as the motion vector coefficients of the block 506. The prediction error frame is then defined by means of the reference block 530.

The motion vector coefficients for block 506 can also be defined by calculating a median or average of the motion vector coefficients of the blocks 510, 512 and 514.

Also, if several motion models are used, the used motion model is indicated.

The block 534 is intra-coded, so it does not have a reference frame and is thus not used in coding the block 506, if a preferable coding method is found otherwise.

The number and location of the neighbouring blocks and the number of the stored reference frames may differ from what is shown in FIG. 5.

Figure 9:
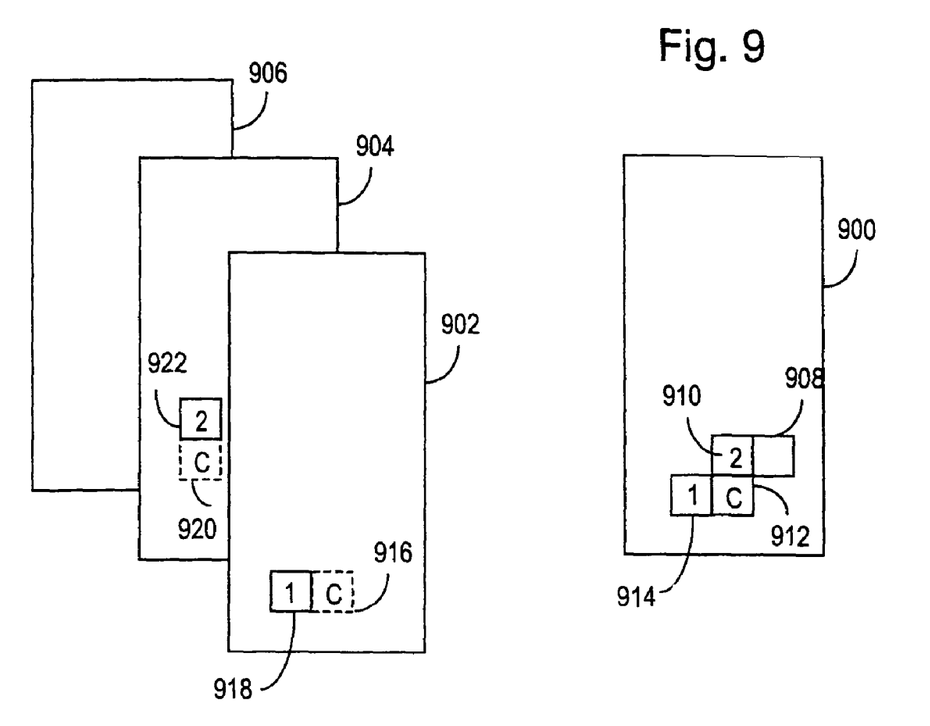
FIG. 9 illustrates a second example of finding a reference block and predicting a motion vector.

FIG. 9 illustrates a second example of predicting motion vectors and finding a reference block. In this example, the block being coded is coded by means of only one neighbouring block, if only one neighbouring block has been inter-coded and this neighbouring block has the same reference frame as the block being coded.

The frame 900 being coded is divided into blocks, of which only a few are shown for clarity's sake. Block 912 is the one being coded. Frames 902, 904 and 906 are reference frames stored in memory. The reference frame of the earlier coded neighbouring block 914 (marked as 1) is the frame 902 and the reference frame of block 910 (marked as 2) is the frame 904. The block 908 is intra-coded, so it does not have a reference frame.

The example in FIG. 9 tests whether for the block 912 being coded suitable reference blocks can be found of all the reference frames stored in memory, i.e. frames 902, 904, 906 in this example. When testing whether the frame 902 has a suitable reference block, the motion vector of the block 914 is used as the motion vector prediction candidate, since the block 914 is the only one of the three neighbouring blocks, whose reference frame is the frame 902. When testing whether the frame 904 has a suitable reference block, the motion vector of the block 910 is used as the motion vector prediction candidate, since the block 910 is the only one of the three neighbouring blocks, whose reference frame is the frame 904. The frame 906 is not a reference frame for any of the neighbouring blocks, so in the case described in the example, the motion vector is predicted using a median of the blocks 910, 914 and 908, for instance, in which case the motion vector of the inter-coded block 908 is set to zero.

It should be noted that in predicting the motion vectors of the block being coded, it is possible to use not only the motion data of the neighbouring blocks and the reference frame data, but also segmentation information of the macro block, for instance, to which the block being coded belongs. The number and location of the neighbouring blocks and the number of the stored reference blocks may differ from that shown in FIG. 9.

Figure 6:
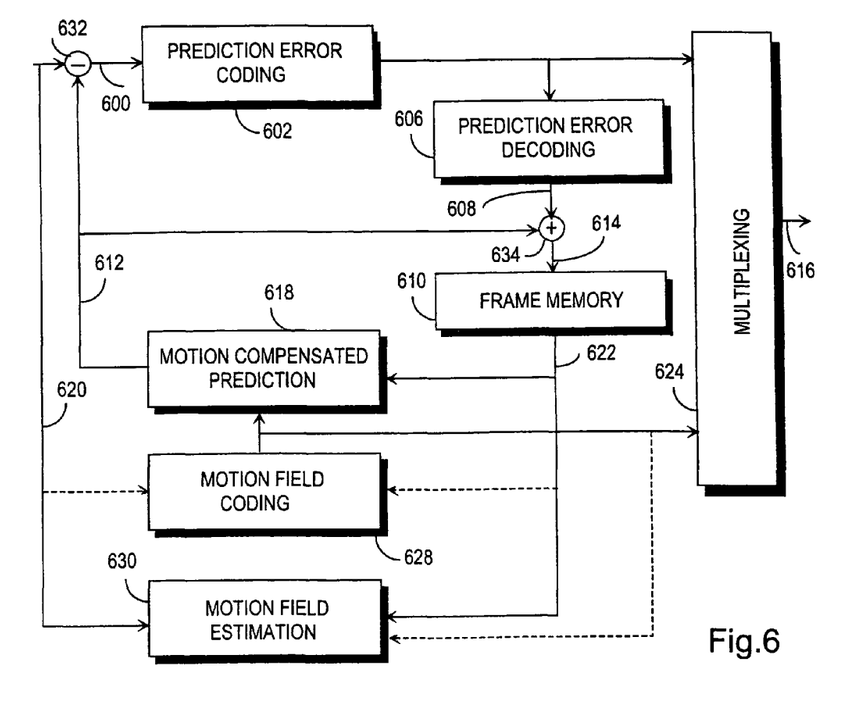
FIG. 6 illustrates an example of a coder.

FIG. 6 shows an example of a coder with which the above-mentioned method of coding video frames can be implemented. A design principle of video coders is to minimize the prediction error frame $E_n(x, y)$ 600 between the block being coded $I_n(x, y)$ 620 and the prediction candidate (the selected reference block) $P_n(x, y)$ 612. The prediction error frame is defined as a difference between the block being coded 620 and the prediction-candidate 612, which is obtained in an adder 632, thus $$E_n(x, y)=I_n(x, y)-P_n(x, y) \quad (4)$$

The prediction block 612 is obtained by a method according to a preferred embodiment of the invention by using a selected reference frame and motion vectors. The coefficients of motion vectors $\Delta x(x, y)$, $\Delta y(x, y)$ are formed in the motion vector calculation block 630 as a sum of predicted motion vectors and found difference coefficients. The predicted motion vector coefficients are, according to the preferred embodiment of the invention, obtained using the motion vectors of the neighbouring blocks which have the same reference frame as the block being coded. Other methods are also used in predicting motion vectors, one of them is a prior art method in which the block being coded is coded directly by means of a reference frame. The group of the motion vectors of all pixels in a frame is called a motion vector field. Because there are a great number of pixels in a frame, a frame is in practice divided into blocks in video coding and the motion information is transmitted block by block to the receiver decoder shown in FIG. 7.

At least one motion vector selected from the predicted motion vectors or motion vector fields formed of them are coded in a motion vector coding block 628. Motion models well known in the art, for instance, of which examples are presented above, are used in the coding. The coded motion vectors or motion vector fields formed of them are transmitted to a multiplexer 624.

In block 618, a frame is formed of the frame blocks segment by segment or block by block. The reference block or prediction candidate is of format $$P_n(x, y)=R_n^k[x+\tilde{\Delta}x(x, y), y+\tilde{\Delta}y(x, y)] \quad (5)$$

wherein one or more reference frames $R_n^k(x, y)$ 622 are stored in memory 610 and wherein x and y are vector components, x showing the location of a pixel, frame segment or block in horizontal direction and y in vertical direction, and $\tilde{\Delta}x$ and $\tilde{\Delta}y$ forming the motion vector of a pixel, frame segment or block.

In block 602, the prediction error frame $E_n(x, y)$ 600 is coded, which typically is presented as a finite 2-dimensional series transformation, for instance by means of a discrete cosine transformation (DCT). The coefficients obtained by the DCT transformation are quantized and coded before transmitting them to the multiplexer 624 and the receiver decoder shown in FIG. 7.

The coder also comprises a decoder block 606 in which the prediction error frame $E_n(x, y)$ is decoded. This prediction error frame $\tilde{E}_n(x, y)$ 608 is added in the adder 634 to the prediction block $P_n(x, y)$ 612 and a decoded block $\tilde{I}_n(x, y)$ is obtained as a result, from which a new reference block is obtained, or by combining the blocks belonging to the same page, the reference frame 614 is obtained and stored in memory 610. Thus both the transmitter video coder and the receiver video coder have the same reference frame or block for use.

Figure 7:
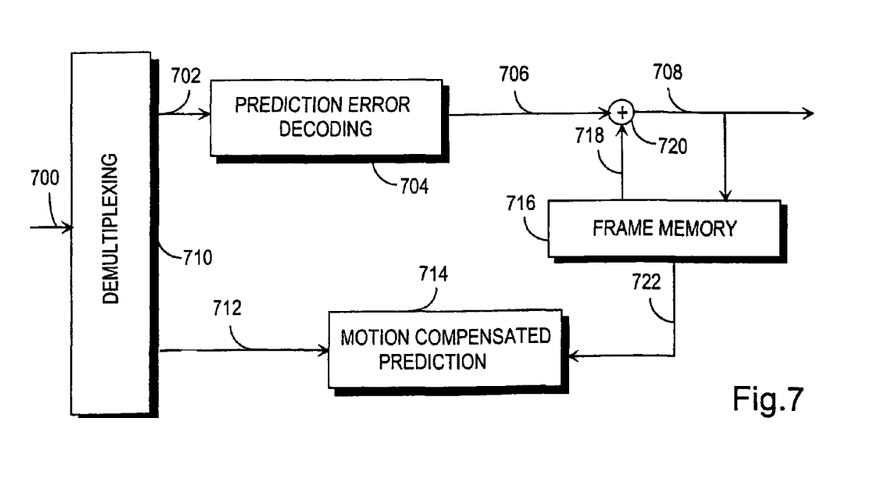
FIG. 7 illustrates an example of a decoder.

In the multiplexer 624, the information containing the motion vector information is combined with the prediction error frame and this frame information 616 is transmitted to the decoder (FIG. 7).

The video coder functions described above can be implemented in many ways, for instance by software executed on a processor or by hardware, such as a logic built of separate components or ASIC (application-specific integrated circuit).

FIG. 7 shows an example of a decoder, by means of which the method described above for reducing temporal redundancy in video frame transfer can be implemented. A coded prediction error frame 702 and coded motion vector coefficients or motion vector field coefficients 712 of a received video signal 700 are separated from each other in a demultiplexer 710.

In the memory 716 of the decoder, there is at least one earlier coded neighbouring block and/or a reference frame $R_n^k(x, y)$ 722 divided into blocks. The same frame blocks and/or reference frame are stored in the coder and decoder memory.

In block 714, a prediction candidate $P_n(x, y)$ 718 is formed in the same manner as in the coder block 618 (FIG. 6). A decoded prediction error frame $\tilde{E}_n(x, y)$ 706 is formed in block 704.

In an adder 720, the decoded prediction error frame $\tilde{E}_n(x, y)$ 706 and prediction candidate $P_n(x, y)$ 718 are added together. This produces a decoded block $\tilde{I}_n(x, y)$ 708 of the format $$\tilde{I}_n(x, y) = P_n(x, y) + \tilde{E}_n(x, y) \qquad (6)$$
$$= R_n^k[x + \tilde{\Delta}x(x, y), y + \tilde{\Delta}y(x, y)] + \tilde{E}_n(x, y)$$

wherein one or more earlier coded neighbouring blocks and/or reference frame $R_n^k(x, y)$ 722 divided into blocks is stored in memory 716 and wherein x and y are vector components, of which x indicates the location of a pixel or a block in horizontal direction and y the location of a pixel or a block in vertical direction, and $\tilde{\Delta}x$ and $\tilde{\Delta}y$ form the motion vector of a pixel, frame segment or block.

The video coder functions described above can be implemented in many ways, for instance by software executed on a processor or by hardware, such as a logic built of separate components or ASIC (application-specific integrated circuit).

Figure 8:
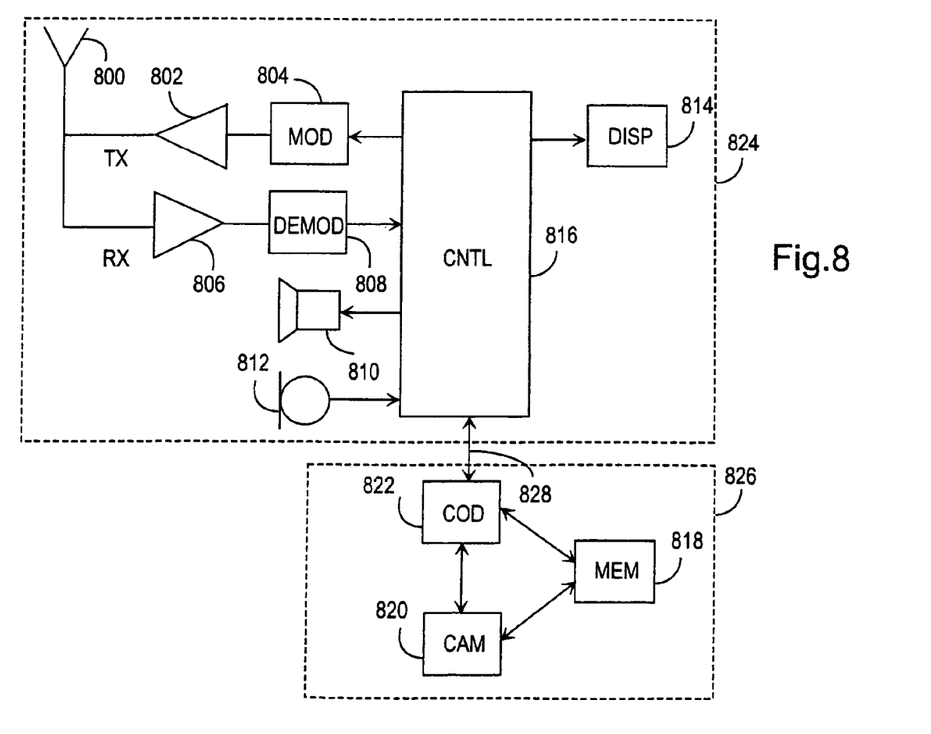
FIG. 8 illustrates an example of a subscriber terminal.

FIG. 8 illustrates one terminal of a radio system, by means of which the method of a preferred embodiment of the invention can be implemented. A transmitter of a subscriber terminal 824 and a transmitter of a radio system network element perform partly the same tasks. The terminal 824 can, for instance, be a mobile phone or microcomputer including radio parts, without limiting the invention thereto. The described terminal comprises an antenna 800 which is used to transmit and receive signals through a duplex filter. The terminal can also comprise several antennas or a multi-antenna system. The terminal also comprises a transmitter 802 which amplifies and transmits to the antenna a modulated signal, a modulator 804 which modulates according to a selected modulation method the carrier with a data signal containing desired information, a receiver 806 which amplifies the signal coming from the antenna and down-converts it to a desired intermediate frequency or directly to base band, a demodulator 808 which demodulates the received signal so that the data signal can be separated from the carrier.

The subscriber terminal also has a control block 816 which controls the operation of the different parts of the terminal, such as a camera 820 and video codec 822, and takes the necessary action to process user speech or data generated by a user, such as digital signal processing (DSP), digital-to-analogue converting and filtering. In addition, in spread-spectrum systems, such as WCDMA, the signal spectrum is spread by means of a pseudo-random spreading code in a transmitter to a broad band and despread in a receiver, thus endeavoring to increase the capacity of the channel. The control block also performs both coding and decoding, such as channel and speech coding. In addition, the control block adapts the signal being transmitted and signaling information to match the air interface standard of the used radio system. The subscriber terminal comprises one or more memories of different type which can be parts of other blocks or separate (not shown). In the example of FIG. 8, the control block also contains a program controlling the operation of the terminal. In the example of the figure, the video codec 822 which codes and decodes the reconstruction data of a frame is separate, but it can also be a part of the control block 816.

When transmitting frames, the camera 820 records a digital picture into the memory block 818. The camera 820 can also record the picture directly into the codec 822. The codec codes a selected frame by means of one of the above methods or by a combination of several methods. The camera 820, codec 822 and memory 818 can reside in the subscriber terminal 824 or belong to a separate camera unit 826, in which case the camera unit 826 is connected to the subscriber terminal 824 with an interface 828.

A user of the subscriber terminal can when necessary view the frame on a display 814. The coded frame reconstruction data is transmitted in the same manner as speech or text data to the telecommunication system and transmitted to another phone, for instance.

The operational blocks of the terminal described above, such as the control block and the codec block 822 required for frame coding and decoding, can be implemented in many ways, for instance by software executed on a processor or by hardware, such as a logic built of separate components or ASIC (application-specific integrated circuit). The terminal functions shown in the figure can also be combined into operational blocks in many ways differing from the figure, the codec block 822 can, for instance, be divided in to a coder and decoder.

The user interface of the terminal comprises a loudspeaker or an ear piece 810, a microphone 812, a display 814 and possibly a keyboard, which all are connected to the control block 816.

Even though the invention has been explained in the above with reference to examples in accordance with the accompanying drawings, it is obvious that the invention is not restricted to them but can be modified in many ways within the scope of the inventive idea disclosed in the attached claims. The invention can be applied together with several video coding standards, such as H.263 or MPEG.

The invention claimed is:

1. A method comprising:
  performing a prediction for a block to be coded using one of plurality of reference frames, the prediction comprising motion data and reference frame number;
  comparing the reference frame number of the block to be coded to the reference frame numbers of the previously coded blocks; and in response to at least one previously coded block having a different reference frame number than the reference frame number of the block to be coded, predicting the motion data of the block to be coded using only the motion data of the previously coded blocks which have the same reference frame number as the block to be coded in a codec.

2. A method according to claim 1, wherein if only one previously coded block has the same reference frame number as the block to be coded, the prediction of the motion data of the block to be coded is set equal to the motion data of the previously coded block which has the same reference frame number as the block to be coded.

3. A method according to claim 2, further comprising:
selecting a motion model from a plurality of motion models; and
signaling the selected motion model.

4. A method according to claim 1, wherein the prediction of the motion data of the block to be coded is the median of the motion data of the previously coded blocks which have the same reference frame number as the block to be coded.

5. A method according to claim 1, wherein the prediction of the motion data of the block to be coded is the average of the motion data of the previously coded blocks which have the same reference frame number as the block to be coded.

6. A method according to claim 1, further comprising:
selecting a motion model from a plurality of motion models; and
signaling the selected motion model.

7. A terminal comprising a video codec arranged to perform a method of encoding a video sequence, the method comprising:
performing a prediction for a block to be coded using one of plurality of reference frames, the prediction comprising motion data and reference frame number;
comparing the reference frame number of the block to be coded to the reference frame numbers of the previously coded blocks; and
in response to at least one previously coded block having a different reference frame number than the reference frame number of the block to be coded, predicting the motion data of the block to be coded using only the motion data of the previously coded blocks which have the same reference frame number as the block to be coded.

8. A terminal according to claim 7, wherein if only one previously coded block has the same reference frame number as the block to be coded, the prediction of the motion data of the block to be coded is set equal to the motion data of the previously coded block which has the same reference frame number as the block to be coded.

9. An apparatus comprising:
a motion prediction block for performing a prediction for a block to be coded using one of plurality of reference frames, the prediction comprising motion data and reference frame number;
a motion coding block for comparing the reference frame number of the block to be coded to the reference frame numbers of the previously coded blocks; and
in response to at least one previously coded block having a different reference frame number than the reference frame number of the block to be coded, the motion vector calculation block is configured to predict the motion data of the block to be coded using only the motion data of the previously coded blocks which have the same reference frame number as the block to be coded.

10. An apparatus according to claim 9, wherein if only one previously coded block has the same reference frame number as the block to be coded, the prediction of the motion data of the block to be coded is set equal to the motion data of the previously coded block which has the same reference frame number as the block to be coded.

11. An apparatus according to claim 10, wherein the motion vector calculation block is configured to select a motion model from a plurality of motion models and the encoder further comprises:
a multiplexer for signaling the selected motion model.

12. An apparatus according to claim 9, wherein the prediction of the motion data of the block to be coded is the median of the motion data of the previously coded blocks which have the same reference frame number as the block to be coded.

13. An apparatus according to claim 9, wherein the prediction of the motion data of the block to be coded is the average of the motion data of the previously coded blocks which have the same reference frame number as the block to be coded.

14. An apparatus according to claim 9, wherein the motion vector calculation block is configured to select a motion model from a plurality of motion models and the encoder further comprises:
a multiplexer for signaling the selected motion model.

15. A computer-readable medium encoded with instructions that, when executed by a computer, perform:
performing a prediction for a block to be coded using one of plurality of reference frames, the prediction comprising motion data and reference frame number;
comparing the reference frame number of the block to be coded to the reference frame numbers of the previously coded blocks; and
in response to at least one previously coded block having a different reference frame number than the reference frame number of the block to be coded, predicting the motion data of the block to be coded using only the motion data of the previously coded blocks which have the same reference frame number as the block to be coded.

16. A computer-readable medium according to claim 15, wherein if only one previously coded block has the same reference frame number as the block to be coded, the prediction of the motion data of the block to be coded is set equal to the motion data of the previously coded block which has the same reference frame number as the block to be coded.

17. A computer-readable medium according to claim 16, wherein the method further comprises:
selecting a motion model from a plurality of motion models; and
signaling the selected motion model.

18. A computer-readable medium according to claim 15, wherein the prediction of the motion data of the block to be coded is the median of the motion data of the previously coded blocks which have the same reference frame number as the block to be coded.

19. A computer-readable medium according to claim 15, wherein the prediction of the motion data of the block to be coded is the average of the motion data of the previously coded blocks which have the same reference frame number as the block to be coded.

20. A computer-readable medium according to claim 15, wherein the method further comprises:
selecting a motion model from a plurality of motion models; and
signaling the selected motion model.

21. A method comprising:
- receiving motion prediction information for a block to be decoded in encoded video data, the motion prediction information representing at least the reference frame number and motion difference data;
- comparing the reference frame number of the block to be decoded to the reference frame numbers of the previously decoded blocks; and
- in response to at least one previously decoded block having a different reference frame number than the reference frame number of the block to be decoded, predicting the motion data of the block to be decoded using only the motion data of the previously decoded blocks which have the same reference frame number as the block to be decoded.

22. A method according to claim 21, wherein if only one previously coded block has the same reference frame number as the block to be decoded, the prediction of the motion data of the block to be decoded is set equal to the motion data of the previously coded block which has the same reference frame number as the block to be coded.

23. A method according to claim 22, wherein the method further comprises:
- determining a motion model from a plurality of motion models; and
- forming a prediction for the block to be decoded using the motion model and the motion data.

24. A method according to claim 23, wherein the motion model is determined by a signaling in the encoded video data.

25. A method according to claim 21, wherein the prediction of the motion data of the block to be coded is the median of the motion data of the previously coded blocks which have the same reference frame number as the block to be coded.

26. A method according to claim 21, wherein the prediction of the motion data of the block to be coded is the average of the motion data of the previously coded blocks which have the same reference frame number as the block to be coded.

27. A method according to claim 21, wherein the method further comprises:
- determining a motion model from a plurality of motion models; and
- forming a prediction for the block to be decoded using the motion model and the motion data.

28. A method according to claim 27, wherein the motion model is determined by a signaling in the encoded video data.

29. An apparatus comprising:
- a demultiplexing unit for receiving motion prediction information for a block to be decoded in encoded video data, the motion prediction information representing at least the reference frame number and motion difference data;
- a motion prediction block for comparing the reference frame number of the block to be decoded to the reference frame numbers of the previously decoded blocks; and
- for predicting the motion data of the block to be decoded using only the motion data of the previously decoded blocks which have the same reference frame number as the block to be decoded in response to at least one previously decoded block having a different reference number than the reference number of the block to be decoded.

30. An apparatus according to claim 29, wherein if only one previously coded block has the same reference frame number as the block to be decoded, the prediction of the motion data of the block to be decoded is set equal to the motion data of the previously coded block which has the same reference frame number as the block to be coded.

31. An apparatus according to claim 30, wherein the motion prediction block is configured to determine a motion model from a plurality of motion models and to form a prediction for the block to be decoded using the motion model and the motion data.

32. An apparatus according to claim 31, wherein the motion model is determined by a signaling in the encoded video data at the demutiplexing unit.

33. An apparatus according to claim 29, wherein the prediction of the motion data of the block to be coded is the median of the motion data of the previously coded blocks which have the same reference frame number as the block to be coded.

34. An apparatus according to claim 29, wherein the prediction of the motion data of the block to be coded is the average of the motion data of the previously coded blocks which have the same reference frame number as the block to be coded.

35. An apparatus according to claim 29, wherein the motion prediction block is configured to determine a motion model from a plurality of motion models and to form a prediction for the block to be decoded using the motion model and the motion data.

36. An apparatus according to claim 35, wherein the motion model is determined by a signaling in the encoded video data at the demultiplexing unit.

37. A terminal comprising a video codec arranged to perform a method of decoding an encoded video data, the method comprising:
- receiving motion prediction information for a block to he decoded in the encoded video data, the motion prediction information representing at least the reference frame number and motion difference data;
- comparing the reference frame number of the block to be decoded to the reference frame numbers of the previously decoded blocks; and
- in response to at least one previously decoded block having a different reference frame number than the reference frame number of the block to be decoded, predicting the motion data of the block to be decoded using only the motion data of the previously decoded blocks which have the same reference frame number as the block to be decoded.

38. A terminal according to claim 37, wherein if only one previously coded block has the same reference frame number as the block to be coded, the prediction of the motion data of the block to be coded is set equal to the motion data of the previously coded block which has the same reference frame number as the block to be coded.

39. An apparatus comprising:
- means for performing a prediction for a block to be coded using one of plurality of reference frames, the prediction comprising motion data and reference frame number;
- means for comparing the reference frame number of the block to be coded to the reference frame numbers of the previously coded blocks; and
- means for predicting the motion data of the block to be coded using only the motion data of the previously coded blocks which have the same reference frame number as the block to be coded in response to at least one previously coded block having a different reference frame number than the reference frame number of the block to be coded.

40. An apparatus according to claim 39, wherein if only one previously coded block has the same reference frame number as the block to be coded, the prediction of the motion data of the block to be coded is set equal to the motion data of the previously coded block which has the same reference frame number as the block to be coded.

41. An apparatus for decoding an encoded video data, the decoder comprising:
  means for receiving motion prediction information for a block to be decoded in encoded video data, the motion prediction information representing at least the reference frame number and motion difference data;
  means for comparing the reference frame number of the block to be decoded to the reference frame numbers of the previously decoded blocks; and
  means for forming a prediction of the motion data of the block to be decoded using only the motion data of the previously decoded blocks which have the same reference frame number as the block to be decoded in response to at least one previously decoded block having a different reference frame number than the reference frame number of the block to be decoded.

42. An apparatus according to claim 41, wherein if only one previously coded block has the same reference frame number as the block to be decoded, the prediction of the motion data of the block to be decoded is set equal to the motion data of the previously coded block which has the same reference frame number as the block to be coded.

43. An apparatus according to claim 42, wherein the decoder further comprises:
  means for determining a motion model from a plurality of motion models by a signaling in the encoded video data; and
  means for forming a prediction for the block to be decoded using motion model and the motion data.

44. An apparatus according to claim 41, wherein the decoder further comprises:
  means for determining a motion model from a plurality of motion models by a signaling in the encoded video data; and
  means for forming a prediction for the block to be decoded using the motion model and the motion data.

45. A computer-readable medium encoded with instructions that, when executed by a computer, perform:
  receiving motion prediction information for a block to be decoded in the encoded video data, the motion prediction information representing at least the reference frame number and motion difference data;
  comparing the reference frame number of the block to be decoded to the reference frame numbers of the previously decoded blocks; and
  in response to at least one previously decoded block which has a different reference frame number than the reference frame number of the block to be decoded, predicting the motion data of the block to be decoded using only the motion data of the previously decoded blocks which have the same reference frame number as the block to be decoded.

46. A computer-readable medium according to claim 45, wherein if only one previously coded block has the same reference frame number as the block to be coded, the prediction of the motion data of the block to be coded is set equal to the motion data of the previously coded block which has the same reference frame number as the block to be coded.

47. A computer-readable medium according to claim 45, wherein the method further comprises:
  determining a motion model from a plurality of motion models by a signaling in the encoded video data; and
  forming a prediction for the block to be decoded using the motion model and the motion data.

48. A method comprising:
  predicting a motion vector for a block to be coded based only on a motion vector of previously coded neighboring blocks which have the same reference frame used for predicting the block to be coded in response to at least one previously coded neighboring block having a different reference frame than the reference frame used for the block to be coded in a codec.

49. A method according to claim 48, wherein when only one previously coded neighboring block has the same reference frame as the block to be coded. the prediction of the motion vector of the block to be coded is set equal to the motion vector of the previously coded neighboring block which has the same reference frame as the block to be coded.

50. A method comprising:
  predicting a motion vector for a block to be decoded based only on a motion vector of previously decoded neighboring blocks which have the same reference frame used for predicting the block to be decoded in response to at least one previously decoded neighboring block having a different reference frame than the reference frame used for the block to be decoded in a codec.

51. A method according to claim 50, wherein when only one previously decoded neighboring block has the same reference frame as the block to be decoded, the prediction of the motion vector of the block to be decoded is set equal to the motion vector of the previously coded neighboring block which has the same reference frame as the block to be decoded.

52. An apparatus comprising:
  a motion coding block for predicting a motion vector for a block to be coded based only on a motion vector of previously coded neighboring blocks which have the same reference frame used for predicting the block to be coded in response to at least one previously coded neighboring block having a different reference frame than the reference frame used for the block to be coded.

53. An apparatus according to claim 52, wherein when only one previously coded neighboring block has the same reference frame as the block to be coded, the prediction of the motion vector of the block to be coded is set equal to the motion vector of the previously coded neighboring block which has the same reference frame as the block to be coded.

54. An apparatus comprising:
  a motion coding block for predicting a motion vector for a block to be decoded based only on a motion vector of previously decoded neighboring blocks which have the same reference frame used for predicting the block to be decoded in response to at least one previously decoded neighboring block having a different reference frame than the reference frame used for the block to be decoded.

55. An apparatus according to claim 54, wherein when only one previously decoded neighboring block has the same reference frame as the block to be decoded, the prediction of the motion vector of the block to be decoded is set equal to the motion vector of the previously decoded neighboring block which has the same reference frame as the block to be decoded.

* * * * *

UNITED STATES PATENT AND TRADEMARK OFFICE
CERTIFICATE OF CORRECTION

PATENT NO. : 8,005,145 B2  
APPLICATION NO. : 10/885256  
DATED : August 23, 2011  
INVENTOR(S) : Lainema Page 1 of 1

It is certified that error appears in the above-identified patent and that said Letters Patent is hereby corrected as shown below:

Column 15, line 33, in Claim 25, delete "coded," and insert -- coded. --, therefor.

Column 16, line 8, in Claim 32, delete "demutiplexing" and insert -- demultiplexing --, therefor.

Column 16, line 32, in Claim 37, delete "to he" and insert -- to be --, therefor.

Signed and Sealed this
Twenty-first Day of February, 2012

David J. Kappos
*Director of the United States Patent and Trademark Office*